(12) United States Patent
Theratil et al.

(10) Patent No.: US 10,215,194 B2
(45) Date of Patent: Feb. 26, 2019

(54) MISTUNED FAN

(71) Applicant: PRATT & WHITNEY CANADA CORP., Longueuil (CA)

(72) Inventors: Ignatius Theratil, Mississauga (CA); Krishna Prasad Balike, Mississauga (CA); Richard Ivakitch, Toronto (CA); Sean Michael Kelly, Milton (CA); Peter Townsend, Mississauga (CA); Ronald Dutton, Mississauga (CA); Paul Stone, Guelph (CA); Robert Venditti, Woodbridge (CA); Daniel Fudge, Vaughan (CA); Milica Kojovic, Oakville (CA); Aldo Abate, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 335 days.

(21) Appl. No.: 14/976,701

(22) Filed: Dec. 21, 2015

(65) Prior Publication Data
US 2017/0175776 A1    Jun. 22, 2017

(51) Int. Cl.
| | |
|---|---|
| *F04D 29/66* | (2006.01) |
| *F01D 5/16* | (2006.01) |
| *F04D 29/32* | (2006.01) |
| *F04D 29/38* | (2006.01) |
| *F01D 5/14* | (2006.01) |
| *F01D 5/28* | (2006.01) |

(52) U.S. Cl.
CPC ............. *F04D 29/666* (2013.01); *F01D 5/16* (2013.01); *F01D 5/141* (2013.01); *F01D 5/28* (2013.01); *F04D 29/324* (2013.01); *F04D 29/384* (2013.01)

(58) Field of Classification Search
CPC .................................. F01D 5/16; F04D 29/666
See application file for complete search history.

(56) References Cited

U.S. PATENT DOCUMENTS

| | | | |
|---|---|---|---|
| 3,347,520 | A | 10/1967 | Owczarek |
| 4,097,192 | A | 6/1978 | Kulina |
| 4,878,810 | A | 11/1989 | Evans |
| 5,286,168 | A | 2/1994 | Smith |
| 5,966,525 | A | 10/1999 | Manzi et al. |

(Continued)

FOREIGN PATENT DOCUMENTS

| | | |
|---|---|---|
| EP | 2896791 A1 | 7/2015 |
| GB | 2490127 | 10/2012 |

(Continued)

OTHER PUBLICATIONS

Extended European Search Report, dated May 16, 2017, EP patent application No. 16189345.8.

*Primary Examiner* — Richard A Edgar
(74) *Attorney, Agent, or Firm* — Norton Rose Fulbright Canada LLP

(57) ABSTRACT

A compressor rotor for a gas turbine engine is described which includes sets of blades having different airfoil thickness distributions, each including a frequency modifier forming a thickness differential relative to a baseline blade thickness. The frequency modifiers provide different natural vibration frequencies for each of the blades, and facilitate modifying natural vibration frequency separation between adjacent blades of the compressor rotor.

40 Claims, 7 Drawing Sheets

(56) References Cited

U.S. PATENT DOCUMENTS

| | | | |
|---|---|---|---|
| 6,042,338 A * | 3/2000 | Brafford | F04D 29/666 |
| | | | 416/203 |
| 6,183,197 B1 | 2/2001 | Bunker et al. | |
| 6,379,112 B1 | 4/2002 | Montgomery | |
| 6,428,278 B1 | 8/2002 | Montgomery et al. | |
| 6,471,482 B2 | 10/2002 | Montgomery et al. | |
| 6,976,826 B2 * | 12/2005 | Roy | F01D 5/141 |
| | | | 416/1 |
| 7,024,744 B2 | 4/2006 | Martin et al. | |
| 7,207,772 B2 | 4/2007 | Johann | |
| 7,234,914 B2 | 6/2007 | Usab et al. | |
| 7,643,975 B2 | 1/2010 | Vahdati et al. | |
| 7,648,330 B2 | 1/2010 | Schwaller et al. | |
| 7,878,759 B2 | 2/2011 | Mills et al. | |
| 8,043,063 B2 * | 10/2011 | Kelly | F01D 5/16 |
| | | | 416/203 |
| 8,172,510 B2 | 5/2012 | Duong et al. | |
| 8,540,490 B2 | 9/2013 | Ramakrishnan et al. | |
| 8,656,589 B2 | 2/2014 | Kurt-Elli | |
| 8,678,752 B2 | 3/2014 | Delvaux et al. | |
| 9,062,554 B2 | 6/2015 | Bielek | |
| 9,097,125 B2 | 8/2015 | Ghorbani et al. | |
| 9,121,284 B2 | 9/2015 | Pope | |
| 9,410,436 B2 | 8/2016 | Kulathu et al. | |
| 9,683,447 B2 | 6/2017 | Gentile et al. | |
| 9,938,854 B2 | 4/2018 | Simpson et al. | |
| 2002/0064458 A1 | 5/2002 | Montgomery et al. | |
| 2006/0073022 A1 | 4/2006 | Gentile et al. | |
| 2008/0134504 A1 | 6/2008 | Schoenenborn | |
| 2010/0247310 A1 | 9/2010 | Kelly et al. | |
| 2013/0142659 A1 | 6/2013 | Glaspey | |
| 2013/0170947 A1 | 7/2013 | Kurt-Elli et al. | |
| 2013/0195652 A1 | 8/2013 | Pope | |
| 2013/0202444 A1 | 8/2013 | Wunderer | |
| 2014/0294595 A1 | 10/2014 | Carroll et al. | |
| 2014/0314548 A1 | 10/2014 | Rivers et al. | |
| 2015/0139789 A1 | 5/2015 | Schoenenborn | |
| 2015/0292337 A1 | 10/2015 | Gentile et al. | |
| 2015/0322803 A1 | 11/2015 | Fulayter et al. | |
| 2016/0017796 A1 | 1/2016 | Xu et al. | |
| 2016/0053617 A1 | 2/2016 | Grelotti et al. | |
| 2016/0238034 A1 | 8/2016 | Fulayter et al. | |
| 2016/0305251 A1 | 10/2016 | Fielding | |
| 2016/0333894 A1 | 11/2016 | K. et al. | |
| 2017/0159676 A1 | 6/2017 | Schoenenborn | |
| 2017/0175761 A1 | 6/2017 | Schwarz et al. | |
| 2017/0175776 A1 | 6/2017 | Theratil et al. | |
| 2018/0038382 A1 | 2/2018 | Foster et al. | |
| 2018/0209275 A1 | 7/2018 | Abrari | |

FOREIGN PATENT DOCUMENTS

| | | |
|---|---|---|
| JP | 2003106295 | 4/2003 |
| WO | 2014130332 | 8/2014 |
| WO | 2014197119 | 12/2014 |
| WO | 2015023325 | 2/2015 |
| WO | 2014197119 | 3/2015 |
| WO | 2015112305 | 7/2015 |

* cited by examiner

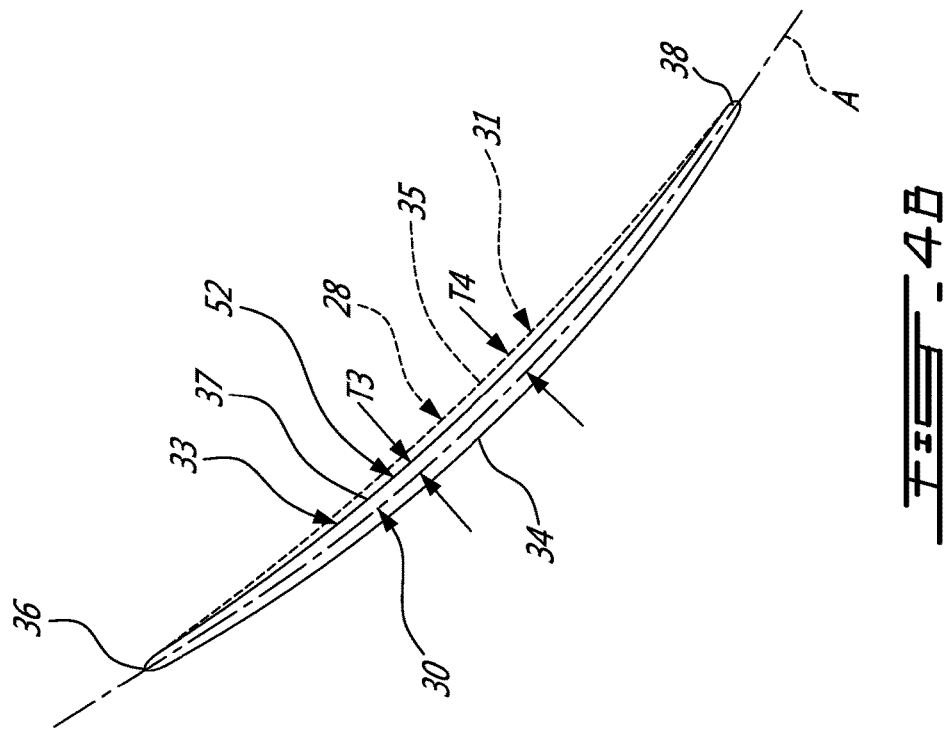
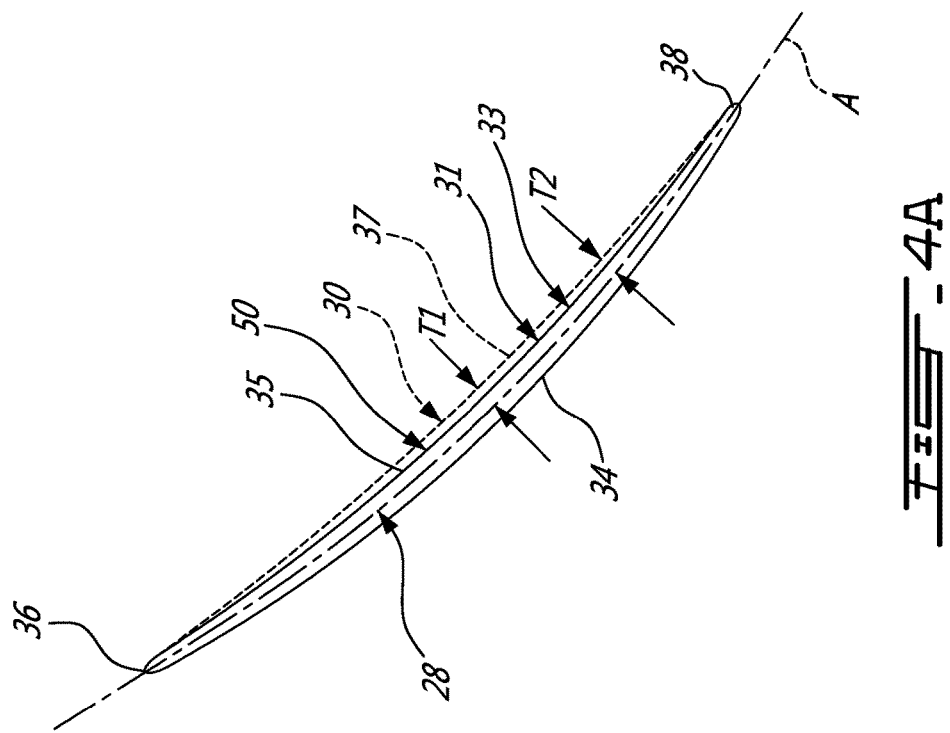

MISTUNED FAN

TECHNICAL FIELD

The application relates generally to rotating airfoils and, more particularly, to controlling frequency responses thereof.

BACKGROUND

Compressor rotors of gas turbine engines, such as the fan of a turbofan, may experience two main types of aerodynamic instability: stall flutter and supersonic flutter, as shown in FIG. 6. Stall flutter (sometimes simply called "flutter") is sub-sonic or transonic and may occur when two or more adjacent blades in a blade row vibrate at a frequency close to their natural vibration frequency and the vibration motion between the adjacent blades is substantially in phase. Stall flutter also typically occurs over a limited speed band, often just below design speed conditions.

Supersonic flutter (which can be either stalled or unstalled, as shown in FIG. 6) occurs in the high speed regime of the compressor or fan where tip speed is very high. Unlike stall flutter in the subsonic or transonic flow regime, supersonic flutter can cause an operational barrier—i.e. it is not possible to simply accelerate through a speed range in order to stop and/or limit the effects of supersonic flutter once it occurs. Supersonic flutter may occur under certain flight conditions. Prolonged operation of a fan or compressor rotor undergoing supersonic flutter can produce a potentially undesirable result caused by airfoil stress load levels exceeding threshold values.

SUMMARY

There is accordingly provided a mistuned fan for a gas turbine engine, the fan comprising fan blades circumferentially distributed around and extending a span length from a central hub, the fan blades including successively alternating first and second fan blades each having airfoil with a pressure side and a suction side disposed on opposed sides of a median chord line, the pressure side and suction side extending on opposed sides of the airfoils between a leading edge and a trailing edge, the first and second fan blades respectively having different first and second airfoil thickness distributions, the first airfoil thickness distribution including a first baseline thickness and a first frequency modifier on the pressure side, the first frequency modifier defining an airfoil thickness differential relative to the first baseline thickness and being located at a first span distance away from the central hub, and the second airfoil thickness distribution including a second baseline thickness and a second frequency modifier on the pressure side, the second frequency modifier defining an airfoil thickness differential relative to the second baseline thickness and being located at a second span distance away from the central hub, the second span distance being different from the first span distance, the first and second frequency modifiers generating different natural vibration frequencies for each of the first and second fan blades, wherein a thickness of the airfoil of the first fan blade at the first span distance is less than the thickness of the second fan blade at the first span distance, and a thickness of the airfoil of the second fan blade at the second span distance is less than the thickness of the first fan blade at the second span distance, and the first span distance corresponds to a span-wise location of high strain energy and the second span distance corresponds to a span-wise location of low strain energy.

There is also provided a mistuned compressor rotor assembly for a gas turbine engine, the mistuned compressor rotor assembly comprising a hub to which a plurality of airfoil blades are mounted, the airfoil blades each having an airfoil selected from at least first and second airfoil types and arranged as generally alternating with one another around the circumference of the rotor, the first airfoils having an airfoil thickness less than an airfoil thickness of the second airfoils at a first selected span of the respective blades, and the second airfoils having an airfoil thickness less than an airfoil thickness of the first airfoil at a second selected span of the respective blades different from the first selected span.

There is also provided a compressor for a gas turbine engine, the compressor comprising: a plurality of first blades having a first airfoil thickness distribution defining a first natural vibration frequency; a plurality of second blades having a second airfoil thickness distribution different from the first airfoil thickness distribution and defining a second natural vibration frequency different from the first natural vibration frequency; the first airfoil thickness distribution including a first frequency modifier on the pressure side of the first blades at a first span distance away from the central hub and the second airfoil thickness distribution defining a second first frequency modifier on the pressure side of the second blades at a second span distance away from the central hub, the second span distance different from the first span distance, wherein first and second pressure side airfoil thicknesses are respectively defined by the first and second first frequency modifiers, wherein the first pressure side airfoil thickness of the first blades is less than a thickness of the second blades at the first span distance, and the second pressure side airfoil thickness of the second blades is less than a thickness of the first blades at the second span distance, and the first span distance corresponds to a span-wise location of high strain energy and the second span distance corresponds to a span-wise location of low strain energy.

There is further provided a method of mitigating supersonic flutter in a compressor rotor, the rotor having a plurality of circumferentially disposed blades, the method comprising the steps of: providing a nominal airfoil having a nominal airfoil definition; determining a first span location associated with a region of high strain energy expected on the airfoil while in use on the compressor rotor; determining a second span location associated with a region of low strain energy expected on the airfoil while in use on the compressor rotor; providing a first blade airfoil definition substantially the same as the nominal airfoil definition but having a different thickness at the first span location associated with the region of high strain energy; providing a second blade airfoil definition substantially the same as the nominal airfoil definition but having a different thickness at the second span location associated with the region of low strain energy; and providing the compressor rotor where the blades are providing with the first and second blade airfoil definitions in an alternating fashion around the circumference of the rotor.

There is further still provided a method of mitigating supersonic flutter for a fan of a turbofan gas turbine engine, the method comprising: providing the fan with a plurality of fan blades, the fan blades composed of a plurality of pairs of circumferentially alternating first and second fan blades each having a different airfoil thickness distribution on a pressure side of the fan blades, the airfoil thickness distributions creating different natural vibrational frequencies of each of the first and second fan blades; selecting a desired frequency separation between natural vibration frequencies of the first and second fan blades in use, the frequency separation selected to mistune the pairs of fan blades to reduce the occurrence of supersonic flutter of the fan blades; determining respective first and second airfoil thickness distributions of the first and second fan blades to provide said desired frequency separation; and providing the first airfoil thickness distribution on the pressure side of the first fan blade and providing the second airfoil thickness distribution on the pressure side of the second fan blade, wherein the first airfoil thickness distribution includes a first frequency modifier at a first span distance on the first fan blades, and the second airfoil thickness distribution including a second frequency modifier located on the second fan blades at a second span distance different from the first span distance, and selecting the first span distance to correspond to a span-wise location of high strain energy and selecting the second span distance to correspond to a span-wise location of low strain energy.

The methods described above may further comprise one or more of the following features.

Removing material from the pressure side of the first and second fan blades within the first and second reduced thickness zones.

Machining material from the pressure sides of the first and second fan blades within the first and second reduced thickness zones.

Selecting the first span distance of the first reduced thickness zone to correspond to a span-wise location of highest strain energy on the first fan blades.

Selecting the second span distance of the second reduced thickness zone to correspond to a span-wise location of highest deflection of the second fan blades.

Selecting the natural vibration frequency of the first fan blades to be less than a baseline frequency and selecting the natural vibration frequency of the second fan blades to be greater than the baseline frequency, wherein the baseline frequency is defined as the natural vibration frequency of a fan blade having a corresponding size and shape but absent said first and second reduced thickness zones.

Selecting the frequency separation to be between 3 and 10%.

Selecting the frequency separation to be greater than or equal to 5% to target second bending mode supersonic stall flutter.

Selecting the second span distance to be greater than the first span distance.

Positioning the first and second reduced thickness zones within a radially outermost 40% of a total span length of the first and second fan blades.

There is alternately provided a fan for a gas turbine engine, the fan comprising a circumferential row of fan blades circumferentially distributed and projecting a total span length from a central hub, the circumferential row including successively alternating first and second fan blades, each having a pressure side and a suction side disposed on opposed sides of a median line and extending between a trailing edge and a leading edge, the first and second fan blades respectively defining first and second airfoil thickness distributions, the first and second airfoil thickness distributions being different from each other and each defining a unique natural vibration frequency of the respective first and second fan blades, the first airfoil thickness distribution defining a first reduced thickness zone on the pressure side of the first fan blades at a first span-wise location, and the second airfoil thickness distribution defining a second reduced thickness zone on the pressure side of the second fan blades at a second span-wise location, the second span-wise location being different from the first span-wise location, wherein within the first reduced thickness zone, the second fan blades have a greater pressure side thickness than the first fan blades at the same span-wise location, and within the second reduced thickness zone, the first fan blades have a greater pressure side thickness than the second fan blades at the same span-wise location, and wherein the unique natural vibrational frequencies of the first and second fan blades define a frequency separation therebetween sufficient to mistune the alternating first and second fan blades and prevent supersonic flutter of the fan.

There is alternately provided a set of fan blades for a fan of a gas turbine engine, the set of fan blades comprising: a plurality of first fan blades having a first airfoil thickness distribution defining a first natural vibration frequency; a plurality of second fan blades having a second airfoil thickness distribution defining a second natural vibration frequency different from the first natural vibration frequency; wherein the natural vibration frequencies of the first and second fan blades define a frequency separation therebetween sufficient to mistune the alternating first and second fan blades to reduce the occurrence of supersonic flutter of the fan; wherein the first and second airfoil thickness distributions are different from each other, the first airfoil thickness distribution including a first reduced thickness zone on a pressure side of the first fan blades, and the second airfoil thickness distribution including a second reduced thickness zone on a pressure side of the second fan blades at a second span-wise location different from the first span-wise location; and wherein within the first reduced thickness zone, the second fan blade has a greater pressure side thickness than the first fan blade at the same span-wise location, and within the second reduced thickness zone, the first fan blade has a greater pressure side thickness than the second fan blade at the same span-wise location.

There is alternately provided a method of reducing the occurrence of supersonic flutter of a fan in a gas turbine engine, the fan having a circumferential row of fan blades extending from a central hub, the method comprising: providing a vibration frequency separation between each circumferentially adjacent pairs of fan blades, the vibration frequency separation selected to mistune said circumferentially adjacent pairs of fan blades and prevent supersonic flutter of the fan, by providing circumferentially alternating first and second fan blades each having a different airfoil thickness distribution on a pressure side of their airfoils, the airfoil thickness distribution of the first fan blades including a first reduced thickness zone at a first span-wise location, and the second fan blades including a second reduced thickness zone located at a second span-wise location different from the first span-wise location.

BRIEF DESCRIPTION OF THE DRAWINGS

Reference is now made to the accompanying figures, in which:

FIG. 4A is a cross-sectional view taken through lines 4A-4A of both FIGS. 3A and 3B located at a common first span-wise location on the first and second blades, illustrating the two airfoil sections superposed one over the other to show the differences between the pressure side thickness profiles thereof at said first span-wise location;

FIG. 4B is a cross-sectional view taken through lines 4B-4B of both FIGS. 3A and 3B located at a common second span-wise location on the first and second blades, illustrating the two airfoil sections superposed one over the other to show the differences between the pressure side thickness profiles thereof at said second span-wise location;

DETAILED DESCRIPTION

Figure 1:
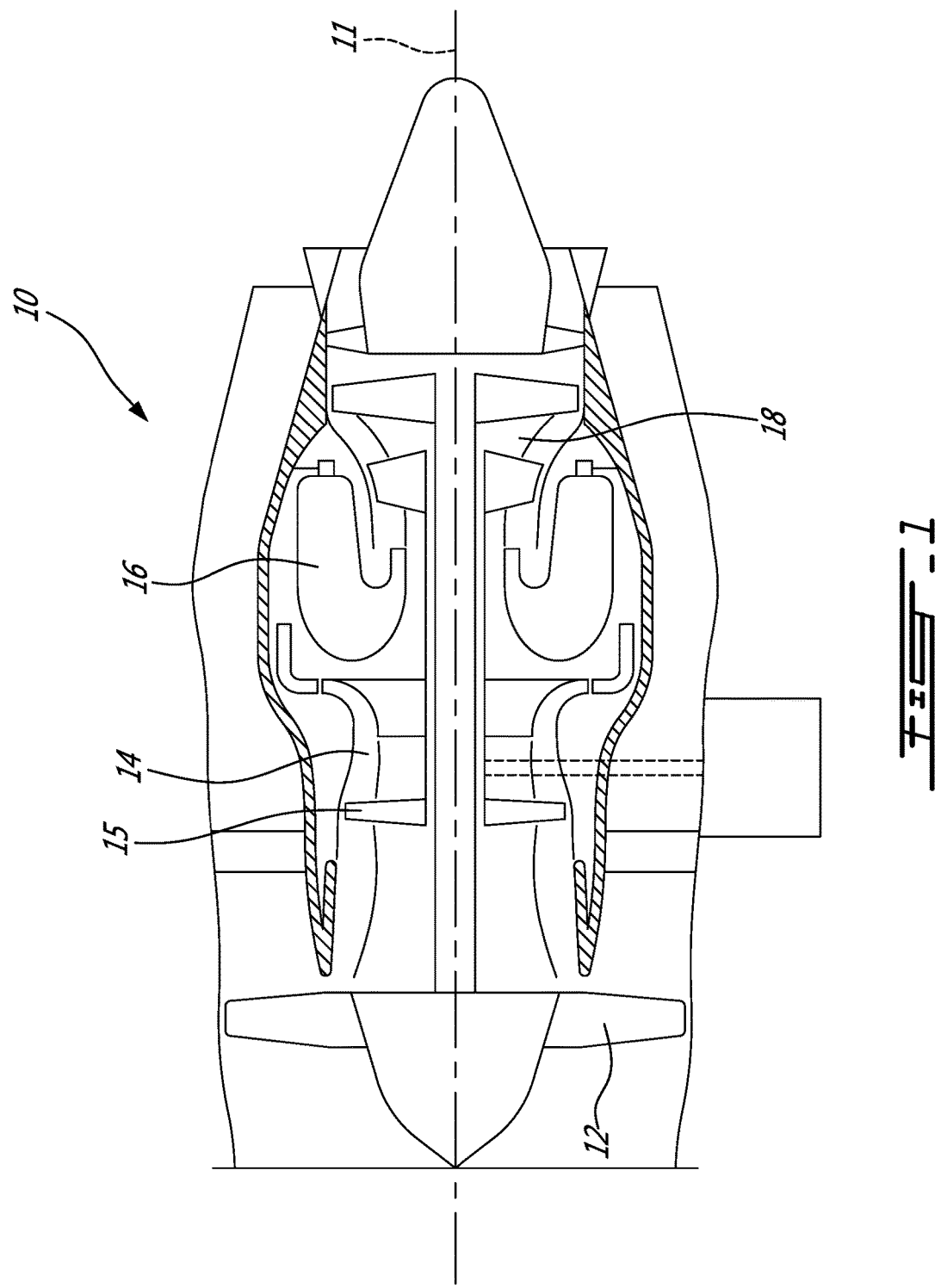
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 having compressor blades 15 for pressurizing the air, a combustor 16 in which the compressed air is mixed with fuel and ignited for generating an annular stream of hot combustion gases, and a turbine section 18 for extracting energy from the combustion gases. Although the example below is described as applied to a fan blade of a turbofan engine, it will be understood the present teachings may be applied to any suitable gas turbine compressor airfoil blade.

Figure 2:
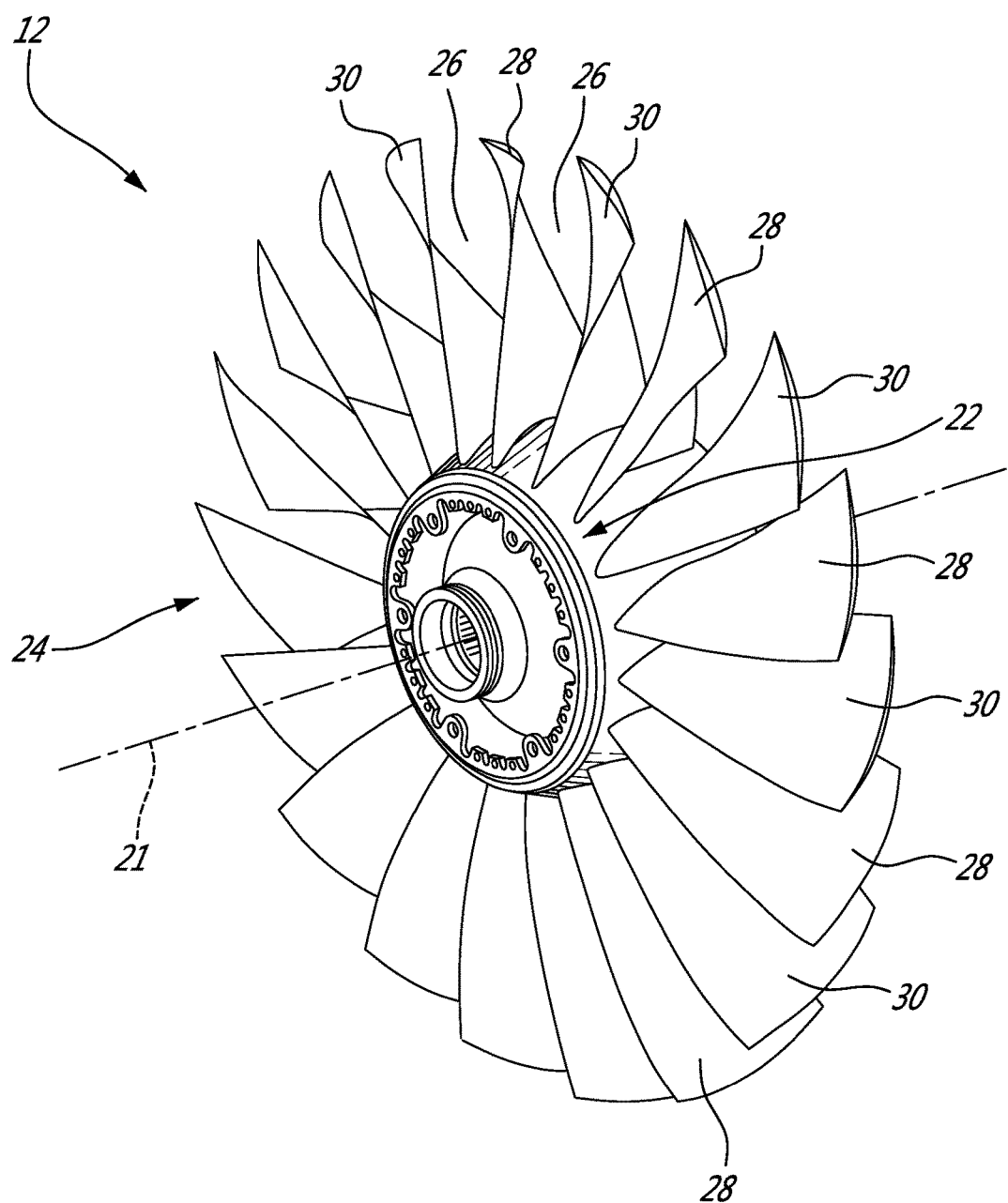
FIG. 2 is a perspective view of a frequency mistuned fan rotor of the gas turbine engine shown in FIG. 1, the fan rotor having a plurality of circumferentially alternating first and second fan blades.

FIG. 2 illustrates a fan 12 of the gas turbine engine 10, which is sometimes referred to as a first stage or low pressure compressor. The fan 12 includes a central hub 22, which in use rotates about an axis of rotation 21, and a circumferential row of fan blades 24 that are circumferentially distributed and which project from the hub 22 in a span-wise direction (which may be substantially radially). The axis of rotation 21 of the fan 12 may be coaxial with the main engine axis 11 of the engine 10 as shown in FIG. 1. The fan 12 may be either a bladed rotor, wherein the fan blades 24 are separately formed and fixed in place on the hub 22, or the fan 12 may be an integrally bladed rotor (IBR), wherein the fan blades 24 are integrally formed with the hub 22. Each circumferentially adjacent pair of the fan blades defines an inter-blade passages 26 therebetween for the working fluid.

The circumferential row of fan blades 24 of the fan 12 includes two or more different types of fan blades 24, in the sense that a plurality of sets of blades are provided, each set having airfoils with non-trivially different mechanical properties, including but not limited to natural vibrational frequencies. More particularly, these two or more different types of fan blades 24 are composed, in this example, of successively circumferentially alternating sets of fan blades, each set including at least first and second fan blades 28 and 30 (the blades 28 and 30 having airfoils 31 and 33, respectively, which are different from one another, as described above and in further detail below).

Referring to FIGS. 3A to 4B, the first and second fan blades 28 and 30 respectively include the first and second airfoils 31 and 33, which each extend in a span-wise direction the same span-wise length L1 from the inner blade hub or platforms 39 to the outer blade tips 40 of each of the blades 28, 30. The leading edges 36 and the trailing edges 38 of the first and second airfoils 31 and 33 are substantially the same, as are most other aspects of their geometry (e.g. camber, twist, etc.), except for pressure side airfoil thickness, as will be seen below.

Figures 3A, 3B:
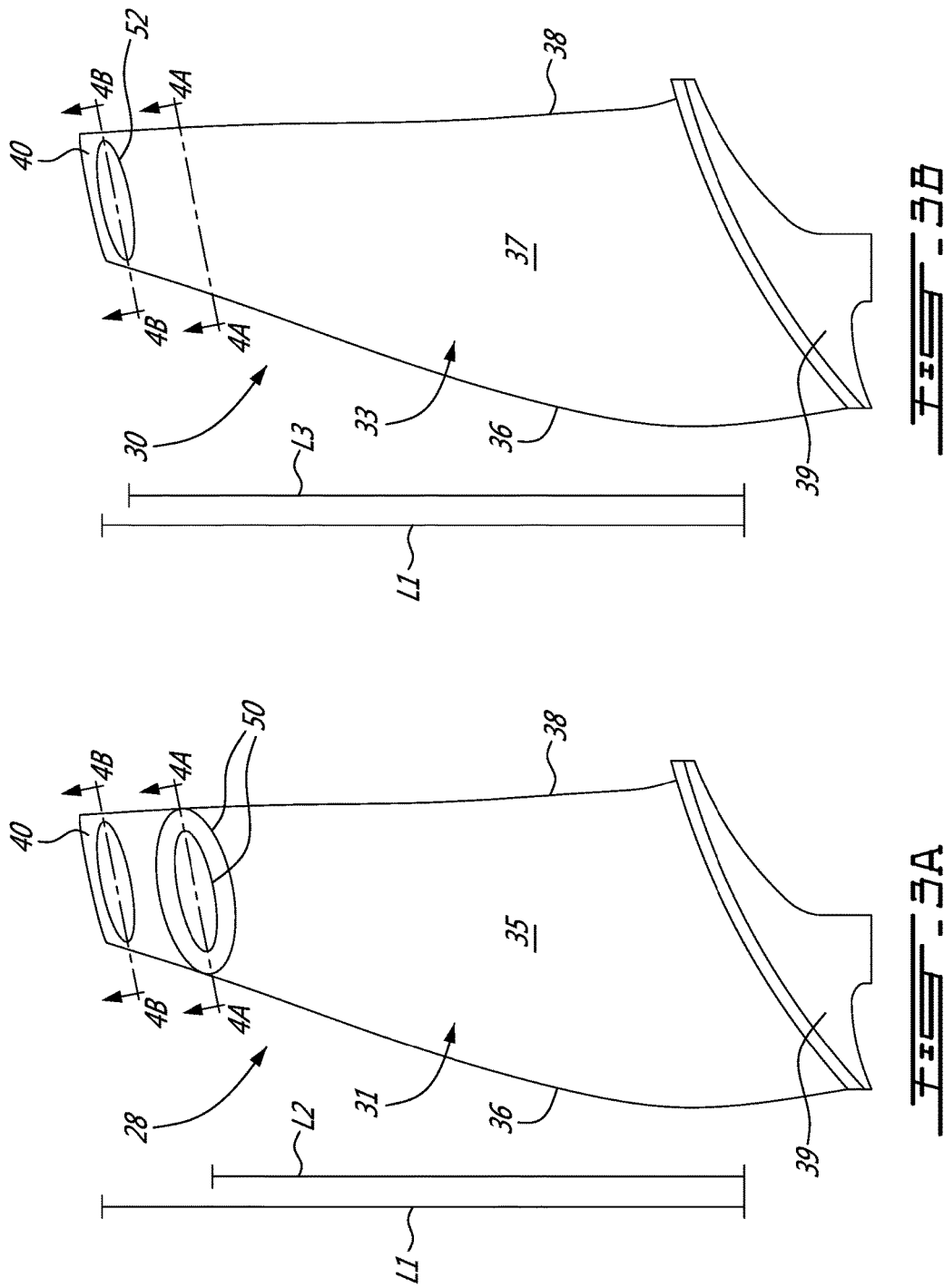
FIG. 3A is a side elevational view of the first fan blade of the fan rotor of FIG. 2.
FIG. 3B is a side elevational view of the second fan blade of the fan rotor of FIG. 2.

In the exemplarity embodiment of FIGS. 2 and 3A-3B, the fan 12 includes circumferentially alternating sets of fan blades 24, each set including two different fan blade types, namely blades 28 and 30. It is to be understood, however, that each of these sets of fan blades 24 may include more that two different blade types, and need not comprise pairs of blade types. For example, each set of fan blades may include three or more fan blades which differ from each other (e.g. a circumferential distribution of the fan blades which is as follows: blade types: A, B, C, A, B, C; or A, B, C, D, A, B, C, D, etc., wherein each of the capitalized letters represent different types of blades as described above). The embodiment described below includes, for the sake of simplicity of explanation, a fan 20 having circumferentially alternating sets of fan blades each composed of only two different blade types, namely blades 28 and 30. This constitutes, in other words, a circumferential distribution of fan blades in this example which follows an arrangement sequence of blade types A, B, A, B, etc.

Each different blade type is provided with a different airfoil thickness distribution relative to the other blade type(s), as will be described herein. The term "airfoil thickness distribution" as used herein means variance in thickness of the airfoil of a blade over the radial, or span-wise, length of the blade from the hub to the tip. Airfoil "thickness" as used herein is the material thickness between the pressure and suction side surfaces of the airfoil of the blade. In one particular embodiment, this may be measured at the center of gravity of a chord-wise airfoil section, however the thickness differential between blades may extend in the chord-wise direction anywhere from their leading edge to their trailing edges.

Referring still to FIG. 2, in the depicted embodiment, each of the circumferentially repeating sets of fan blades include two different fan blade types 28 and 30. As such, in this embodiment, the fan blade row 24 has an even number of fan blades which is composed of circumferentially alternating sets of fan blades, each set being composed of a first fan blade 28 and a second fan blade 30, and the sets successively alternate (e.g. first blade 28, second blade 30, first blade 28, second blade 30, etc.) about the circumference of the hub 22 to provide a fan blade row 24. Accordingly, in this exemplary embodiment, each blade of the first type (e.g. blade 28) is located between two blades of the second type (e.g. blade 30). However, as mentioned, any suitable arrangement may be provided.

Fan blades types 28, 30, etc. are configured to have different natural vibration frequencies and responses relative to one another. In particular, in one example the blades may be configured to define a natural frequency separation between adjacent fan blades in accordance with the present disclosure, as will be further described below.

Figure 6:
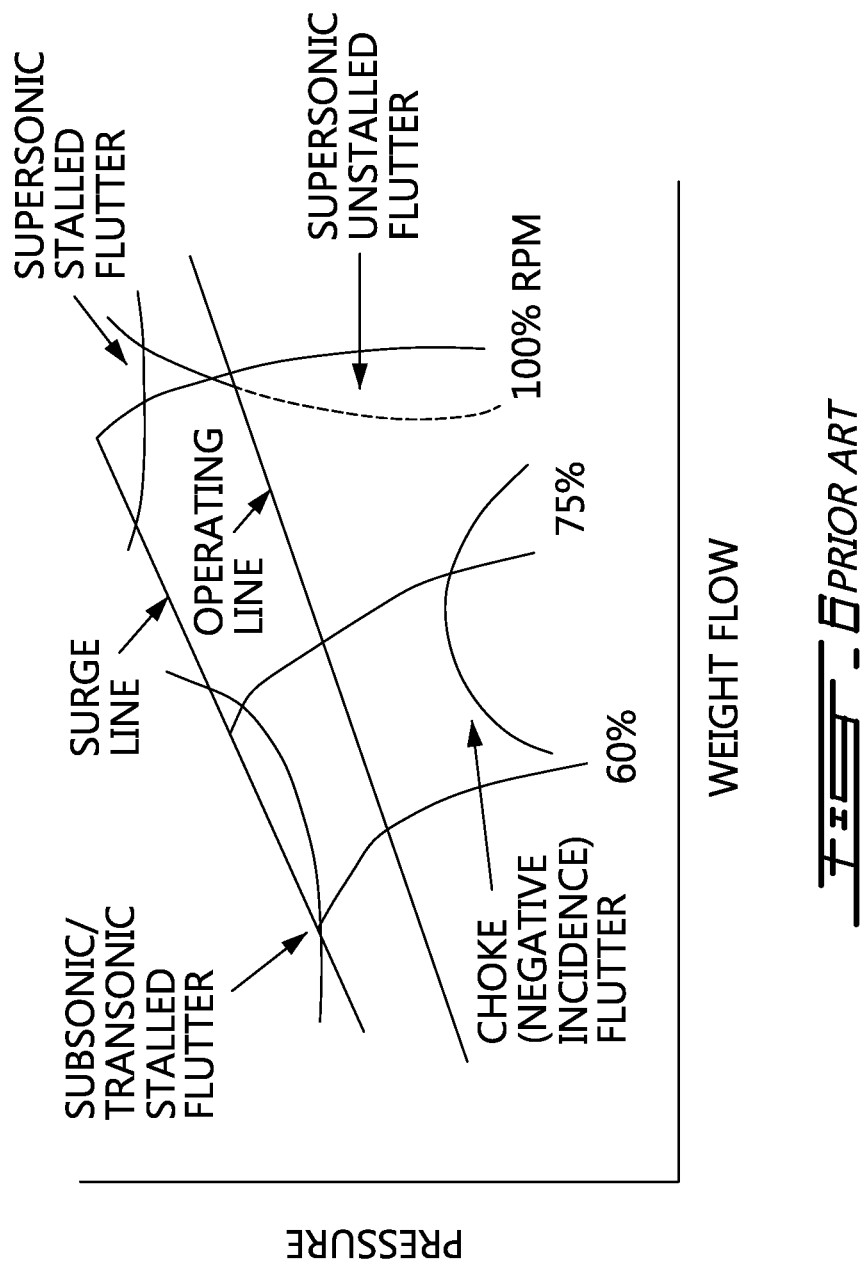
FIG. 6 is a graph illustrating the known different types of fan blade flutter, including the supersonic flutter regime, the graph showing weight flow on the X-axis and pressure on the Y-axis.

To consider briefly the nature of flutter with reference to FIG. 6 and as mentioned above compressor rotors of gas turbine engines, such as fans of turbofan gas turbine engines, are known to experience two main types of aerodynamic instability: subsonic/transonic stalled flutter; and supersonic flutter. Subsonic stall flutter occurs when two or more adjacent blades in a blade row vibrate at a frequency close to their natural vibration frequency and the vibration motion between the adjacent blades is substantially in phase, and, if this occurs at all, it typically occurs over a narrow speed range, often just below design speed conditions. In contrast, supersonic flutter (which can be either stalled or unstalled) occurs in the high speed regime of the fan (i.e. high weight flow of air) where tip speed of the fan blades is very high. Unlike stall flutter, supersonic flutter can cause an operational barrier—i.e. unlike with subsonic stall flutter, it is not possible to accelerate through a narrow affected speed range in order to stop and/or limit the effects of supersonic flutter once it occurs. Unlike previous (i.e. prior art) attempts to address flutter, which have concentrated on the problem of subsonic or transonic stall flutter, the present disclosure may be employed to address the issue of supersonic flutter.

Frequency separation may thus be configured to reduce the occurrence and/or the effect of supersonic flutter in the stalled flow regime. Alternately, or in addition, a frequency separation may reduce the occurrence of supersonic flutter in the un-stalled flow, such as when torsional mode bending vibrations are applied.

Supersonic flutter may be addressed, as described herein, by providing sets of fan blades, each of the blades of the set having physical properties which differ from each other. These differences may include, for example, geometry changes to the airfoils, such as either a removal or the addition of material relative to a baseline or un-modified blade on the pressure sides thereof, wherein the natural vibration frequency of adjacent blades can be made to differ sufficiently to impede unwanted amplification of vibrations among adjacent blades or blade sets (pairs, etc.). This result may be achieved by varying the thickness of the sets of adjacent fan blade airfoils relative to one another. In one example, the thickness difference between blades may be provided substantially only at a single span-wise location of the fan blades of each type.

Returning now to the exemplary fan 12 of FIG. 2, the blade types 28 and 30 are configured to define a natural vibration frequency separation between them. For example, the first and second airfoils 31 and 33 of the first and second fan blades 28 and 30 may be provided with a different airfoil thickness distribution relative to one another, which affects and defines their respective natural vibrational frequency.

Figure 5A:
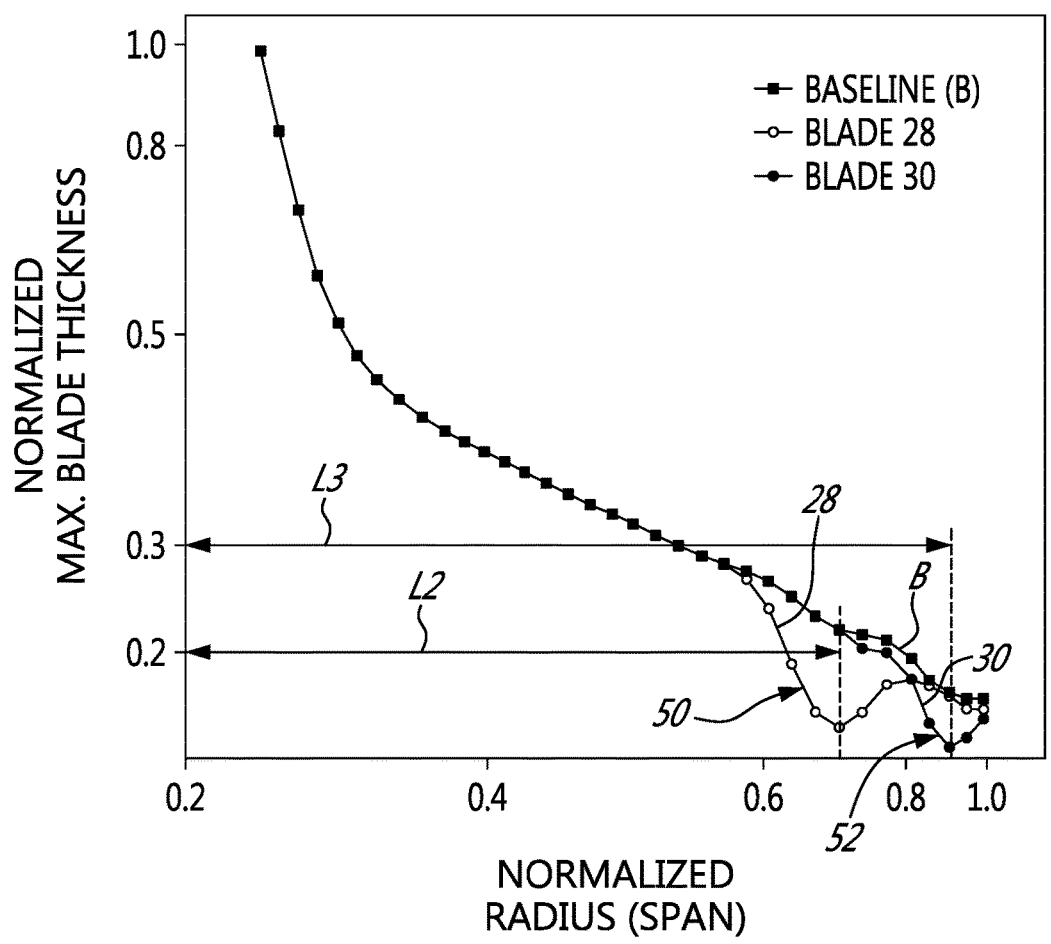
FIG. 5A is a plot illustrating the airfoil thickness distribution of the first and second fan blades of FIGS. 3A and 3B, the plot showing normalized radius (i.e. span-wise distance) on the X-axis and normalized maximum blade thickness on the Y-axis.

The relative difference in airfoil thickness distribution between airfoils 31 and 33 is provided, in this example, at two locations (i.e. one location for each airfoil, overall providing two locations of difference as between the two airfoils), as shown in FIGS. 4A and 4B and FIG. 5A.

The example depicted in FIGS. 4A and 4B shows a cordwise airfoil section of the airfoil 31 (FIG. 4A) and the airfoil 33 (FIG. 4B) at elected span-wise locations. The depicted span-wise locations are not the same as between FIGS. 4A and 4B, as will be discussed further below. The set of blades 28 (FIG. 4A) and 30 (FIG. 4B) in this example have substantially the same suction surface 34, leading edge 36 and trailing edge 38 definitions (i.e. the suction surface 34, the trailing edge 38 and the leading edge 36 contours or outlines of the blades 28 and 30 substantially coincide with each other when corresponding sections are superposed one over the other). Though not visible in FIGS. 4A-4B, the suction surface 34, leading edge 36 and trailing edge 38 definitions of the airfoils 31 and 33 of the blades 28 and 30 in this example may be substantially identical along the entire radial span of the airfoils 31 and 33 (i.e. from the hub 39 to the tip 40).

However, as shown in FIGS. 4A and 4B, the pressure surface 35 of the blade 28 (FIG. 4A) and the pressure side surface 37 of the blade 30 (FIG. 4B) are not identical, and thus do not coincide along the entirety of the airfoil chord shown in FIGS. 4A-4B. In particular, in the depicted embodiment if the two airfoils were superimposed it would be evident that the shape of pressure surface 37 of blade 30 diverges relative to the pressure surface 35 of blade 28. This divergence, affecting the relative airfoil thickness, may extend in the chord-wise direction anywhere from the leading edge 36 to the trailing edge 38, but at least exists within a mid-chord area of the blade at or near the center of gravity of a chord-wise airfoil section. As discussed further below, a divergence of this sort is provided in this example at two span-wise locations, as shown in FIG. 5A.

Referring still to FIGS. 4A-4B, at the first span-wise distance L2 (i.e. at the span-wise position at which lines 4A-4A are taken in both FIGS. 3A and 3B), the pressure side thickness T2 of the airfoil 33 of the second fan blade 30 is greater than the pressure side thickness T1 of the airfoil 31 of the first fan blade 28. At the second span-wise distance L3 (i.e. at the radial position at which lines 4B-4B are taken in both FIGS. 3A and 3B), the pressure side thickness T4 of the airfoil 31 of the first fan blade 28 is greater than the pressure side thickness T3 of the airfoil 33 of the second fan blade 30. As can be appreciated, therefore, the pressure surface thickness T2 of blade 30 is greater than the pressure surface thickness T1 of blade 28 at span-wise distance L2 (FIG. 4A), and the pressure surface thickness T4 of blade 28 is greater than the pressure surface thickness T3 of blade 30 at span-wise distance L3 (FIG. 4B).

The thicknesses T1, T2, T3 and T4 of the pressure surfaces 35 and 37 of the blades 28 and 30, as used herein and depicted in FIGS. 4A to 4B, are defined by the distance of the respective pressure surface from a chord-wise median line A extending through the airfoils 31, 33.

Referring now to FIG. 5A, the thicknesses of the airfoils 31, 33 of the first and second fan blades 28, 30 may thus differ from each other at a selected span-wise location(s) of the airfoils, as will be explained in further detail below. Airfoil thickness variation may be achieved by providing a thicker or thinner airfoil thickness for one airfoil of the set, relative to the other at the selected span-wise location. Thickening/thinning may be provided, for example, by material removed or material added relative to a common baseline airfoil, although any suitable approach to providing different airfoil thicknesses may be employed.

Airfoil thickness may be adjusted as between the airfoils of an airfoil set to change the natural vibrational frequency of the blades relative to one another. As taught herein, the approach may provide a natural vibrational frequency separation between the blades of a set (e.g. in this example first and second fan blades 28 and 30) sufficient to reduce or impede unwanted resonance between them, which may reduce or impede supersonic flutter. Adjusting the relative airfoil thickness may therefore make it possible to impose or control a difference in natural frequency between adjacent airfoil blades.

At least one of the first and second fan blades 28 and 30 therefore may be provided with one or more thickness variations to function as "frequency modifiers" at selected span-wise location(s) along the blade, for example along the pressure sides 35, 37 of their respective the airfoils 31 and 33. In the depicted embodiment (see FIGS. 3A-3B), the first fan blade 28 includes a frequency modifier 50 at a first span-wise distance L2, and the second fan blade 30 includes a frequency modifier 52 at a second span-wise distance L3.

The different span-wise distances L2 and L3 are, in this embodiment, both disposed within the outermost 40% of the blade span-wise length L1.

The term "frequency modifier(s)" as used herein is understood to define a zone of the airfoil in which the thickness of the airfoil differs from a baseline thickness of a theoretical or nominal (baseline) profile defined by a remainder of the airfoil surface(s) outside this frequency-modified zone. Such a frequency modifier may therefore comprise either a local region of reduced or increased thickness relative to the baseline airfoil thickness of a theoretical or normal profile (i.e. referred to herein as a "reduced thickness zone" an "increased thickness zone"). Therefore, in this context, FIGS. 4A and 4B depict a frequency modifier 50, 52 on each airfoil 31 and 33, respectively.

Although the example described includes a frequency modifier on each blade of a set, another example blade set (not shown) may have only one of the airfoils in the set (e.g. only one of airfoils 31 and 33) provided with a frequency modifier(s). Frequency separation (as described herein) is achieved in such an example by "modifying" only one blade of a multi-blade set relative to a theoretical or nominal airfoil profile shared by the airfoils within the set.

In the embodiment shown in FIGS. 3A-3B, the airfoils 31 and 33 of the first and second fan blades 28, 30 each have one frequency modifier 50 and 52, respectively. In this embodiment, these frequency modifiers 50, 52 are local zones of reduced thickness provided on the pressure side of the airfoil (i.e. relative to the baseline thickness of a theoretical or nominal pressure side profile defined by a remainder of the pressure side of the airfoil outside of the reduced-thickness zones of the frequency modifiers 50, 52).

The frequency modifiers 50 and 52 may be created either in the blades 28, 30 as originally produced or may be subsequently formed in existing blades, for example as a repair for post-production modification. In the embodiment depicted, wherein the frequency modifiers 50, 52 are reduced thickness zones appearing substantially only on the pressure side, frequency modifiers 50, 52 may be formed by removing material (such as by machining) from the pressure side of the airfoil 31, 33 at selected span-wise distances L2 and L3, to locally decrease the thickness of the airfoil within these zones relative to the baseline pressure side thickness of the blade (see also FIG. 5A). In an alternate embodiment wherein the frequency modifiers 50, 52, frequency modifiers 50, 52 may be formed by providing a thicker blade by adding material (such as by welding, brazing, etc.) onto the pressure side (for example) of the blade at the selected span-wise distances L2 and L3, to locally increase the thickness of the airfoil within these zones relative to the baseline pressure side thickness of the blade. It will be understood that frequency modifiers need not be two in number nor provided both (all) as a thickness increase or decrease, and that the thickness variations may be provided on the pressure side, suction side, or both.

The span-wise distances (L2 and L3 in this embodiment) of the frequency modifiers 50, 52 are selected to correspond to locations significant to unwanted modal vibration between adjacent blades. In one example, span-wise locations of expected high or low strain energy, and/or span-wise locations of high or low blade displacement may be used, as will now be described.

In the embodiment of FIGS. 3A-5A, the frequency modifier 50 on the first fan blades 28 comprises a localized region, i.e. at a selected span-wise location, of reduced thickness (e.g. relative to blade 30) wherein material is "removed" (so to speak or in fact, as the case may be) from the pressure side surface 35 of the airfoil 31 within the reduced thickness zone of frequency modifier 50 relative to blade 30 at the selected span-wise location. As can be seen in FIG. 5A, doing so provides a thinner pressure side airfoil thickness within this zone located around span-wise distance L2. The frequency modifier 50 is selected to be located at a span-wise distance L2 which corresponds, in use, to an expected region of high strain energy of the blade. This thickness reduction at this location reduces the stiffness of the first blade 28 at the span-wise distance L2 relative to blade 30 at span-wise distance L2, which reduces the natural vibrational frequency of the first blade 28 relative to that of the blade 30 at this span—hence providing frequency modifier 50. It is understood that "high" strain energy means a region of strain energy higher than an average strain energy in the part, and could be though need not be a local or global maximum of strain energy within the blade in use. Typically, regions of highest strain energy occur in an outer region of the blade (i.e. span >50%). Empirically, the skilled reader will appreciate that strain energy is inversely proportional to stiffness, such a high strain energy region is typically less stiff than a low strain energy region.

In an analogous fashion, on second blades 30 frequency modifier 52 may be provided as a localized region of reduced thickness (at a span-wise distance L3) wherein material is "removed" (so to speak or in fact, as the case may be) from the pressure side surface 37 of the airfoil 33 within the modified thickness zone of frequency modifier 52 relative to blade 30 at the selected span-wise location. As can be seen in FIG. 5A, doing so provides a thinner pressure side airfoil thickness within this zone located around span-wise distance L3. However, in this example, the frequency modifier 52 of the second blade 30 is selected to be located at a span-wise distance L3 which corresponds, in use, to an expected region of low strain energy within the airfoil (as determined by any suitable analytical or empirical approach). Thickness reduction at this location reduces the mass of the second blade 30 relative to the first blade 28 at span L3, which increases the frequency of the second blade 30 relative to the first blade 28 at span L3. It is understood that "low" strain energy means a region of strain energy lower than an average strain energy in the part, and could be though need not be a local or global minimum of strain energy within the blade in use, and will typically occur in an outer region of the blade (i.e. span >50%).

As natural frequency is proportional to stiffness and inversely proportional to mass, the natural vibrational frequency may be decreased by reducing the stiffness of blades at region(s) of high strain energy or may be increased by reducing the mass of blades at region(s) of low strain energy.

The location of low strain energy of an airfoil may also correspond, depending on blade configuration, to a location of high deflection of the blade when under operational loading (i.e. a local or global maximum in expected deflection in use).

As such, in the present example, the airfoils 31 of the first fan blades 28 have a first airfoil thickness distribution defining a first reduced thickness zone corresponding to frequency modifier 50 at a first span-wise distance L2 from hub 39, and the airfoils 33 of the second fan blades 30 have a second airfoil thickness distribution defining a second reduced thickness zone corresponding to frequency modifier 52 at a second span-wise distance L3 from hub 39. As mentioned, the first span-wise distance L2 in this example is selected to correspond to a location of high strain energy in first blades 28, and the second span-wise distance L3 is selected to correspond to a location of low strain energy in second blades 30. These locations of high and low strain energy of the blades are selected and/or identified as described below, with reference to FIG. 5B.

Accordingly, as will be appreciated from the above, a resulting natural vibration frequency, F1, of the first fan blades 28 can be manipulated to be lower than a baseline natural vibration frequency Fb (i.e. F1<Fb) of a theoretical or nominal baseline blade configuration from which blade 28 was derived and which does not have frequency modifiers 50 or 52 (for example). Comparably, the resulting natural vibration frequency F2 of the second fan blades 30 can be manipulated to be greater than the same baseline natural vibration frequency Fb (i.e. F2>Fb). Doing so provides a frequency differential ($\Delta F$) or separation between the natural vibration frequencies of blades 28 and 30, which may be employed to provide natural vibration frequencies F1 and F2 sufficiently far apart as to reduce the effect of, or altogether impede, resonance between the blades, for example of the type that causes supersonic flutter.

Alternately, in an example where only one of the blades 28, 30 is provided with a frequency modifier, one of the first and second fan blades 28, 30 may be provided un-modified relative to the baseline airfoil (i.e. free of any frequency modifiers), in which case natural vibration frequency F1, F2 (as the case may be) which is identical to the baseline natural vibration frequency Fb. In such a case, however, there is still provided a frequency differential ($\Delta F$), or separation, between the natural vibration frequencies of the two blades 28 and 30 sufficiently far apart as to reduce the effect of, or altogether impeded, resonance between the blades 28, 30, for example of the type of resonance that causes supersonic flutter.

The result is that, in the described examples, the natural vibration frequencies F1 and F2 of the circumferentially alternating first and second fan blades 28, 30 are made non-trivially different by being "moved apart", or separated, from each other. In the first example provided above, the natural vibration frequencies F1 and F2 are separated in opposite directions from the predefined baseline vibration frequency Fb, though other options applying the present teachings will be apparent to the skilled reader.

The desired airfoil thickness(es) and selected span-wise location(s) for airfoil frequency modifier(s) may be determined in any suitable fashion. Referring again to FIGS. 4A-4B, in one example the reduced pressure side thicknesses T1 and T3, respectively defined within the first and second frequency modifiers 50 and 52, may be selected to be about 50% of the baseline airfoil thickness at the selected span. In another example, the reduced pressure side thicknesses T1 and T3 may be between 40% and 60% of the baseline airfoil thickness at the selected span.

As compressor blades typically decrease in thickness from root to tip, and vibration amplitude is typically inversely proportional to stiffness and thus thickness, resonance problems such as supersonic flutter typically occur on the outer half of the blade span, and more particularly on the outer 40% of span. Therefore, in the described example, both reduced thickness zones of frequency modifiers 50 and 52, respectively located only on the pressure sides 35 and 37 of the airfoils 31 and 33, and therefore the differences in the pressure side thicknesses of the two fan blade 28 and 30, exist only within the radially are located on outermost 40% of the span-wise length L1 of the blades 28, 30. In one particular embodiment, the first span-wise distance L2 of the first reduced thickness zone 50 of the first fan blades 28 is located between 65% and 100% of the span length L1, and the second span-wise distance L3 of the second reduced thickness zone 52 of the second fan blades 30 is located between 80% and 100% of the span length L1. In a further embodiment, the first span-wise distance L2 of the first reduced thickness zone 50 of the first fan blades 28 is located between 65% and 90% of the span length L1, and the second span-wise distance L3 of the second reduced thickness zone 52 of the second fan blades 30 is located between 90% and 100% of the span length L1.

FIG. 5A, which illustrates the airfoil thickness distribution of the first fan blades 28 and the second fan blades 30, depicts that the first frequency modifier 50 (in this case a reduced thickness zone) of the first fan blade 28 is radially located roughly within a span range of 0.6-0.8 (or 60-80%) of the total span, and the second frequency modifier 52 of the second fan blade 30 is radially located roughly within a span range of 0.8-1.0 (or 80-100%).

As can also be seen from the graph of FIG. 5A, at span-wise distance L2 the thickness of blade 28 is less than the thickness of blade 30. In this example, the thickness of blade 28 at span-wise distance L2 is less than half of the thickness of blade 30 at the same span. At span-wise distance L3, however, the thickness of blade 28 is greater than the thickness of blade 30. In this example, the thickness of blade 30 at span-wise distance L3 is less than half of the thickness of blade 28 at the same span. As can also be seen from FIG. 5A, the thickness of blade 30 at the frequency modifier 52 is less than the thickness of blade 28 at the frequency modifier 50. Accordingly, the greater the span at which the frequency modifier is located, the smaller the airfoil thickness within this zone.

Figure 5B:
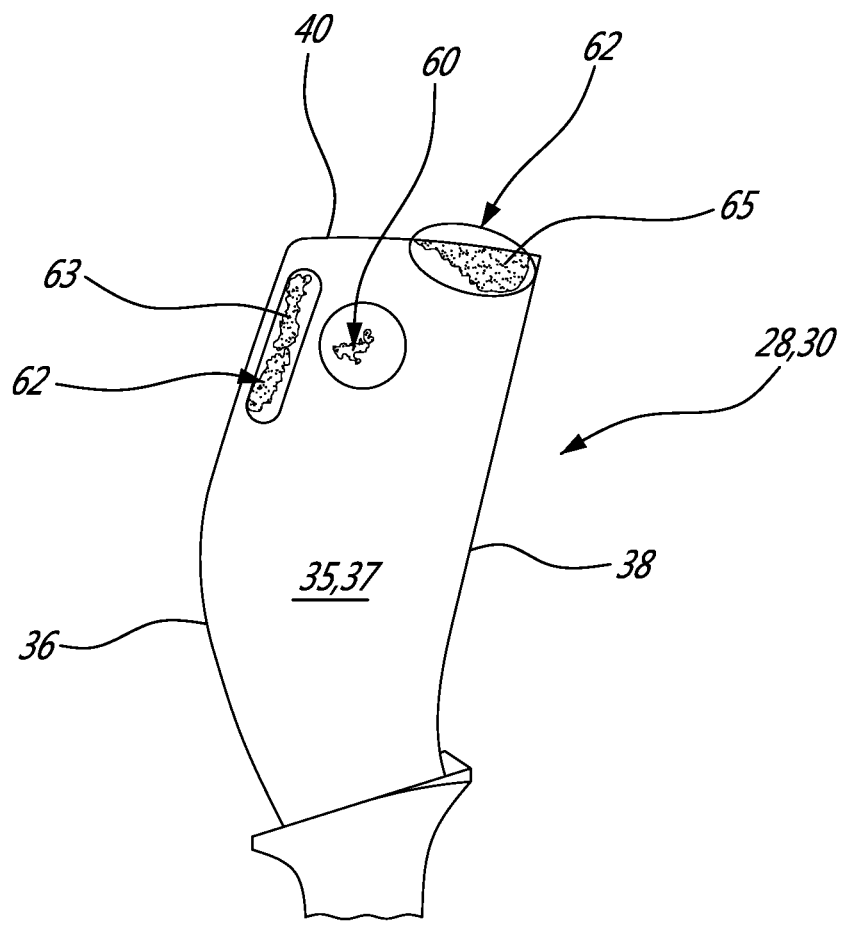
FIG. 5B is a three-dimensional plot illustrating locations of high and low strain energy on the fan blades of FIGS. 3A-3B.

Referring FIG. 5B, regions of high and low strain energy of an exemplary fan blade are shown, using shaded plots on the blade surface, relative to their location on span of the blade. As shown in FIG. 5B, a high strain location on the pressure sides 35, 37 of the blades 28, 30 may exist, for example at region 60 disposed at a chord-wise location between the leading and trailing edges 36, 38 and radially inwardly from the outer tip 40, but within the outermost 40% of the blade span length. In FIG. 5B, two separate and spaced apart regions of low strain energy 62 can be seen, namely a first low strain energy region 63 disposed proximate the leading edge 36 at a span location radially inwardly from the outer tip 40, and a second low strain energy region 65 disposed at a more radially outward location proximate the outer tip 40 but chord-wise closer to the trailing edge 38. As shown in FIG. 5B, a fan blade may, depending on its configuration and operational conditions, have several different locations of high and/or low strain energy. In such cases, high and low stain energy locations for the frequency modifiers 50, 52 as described herein may be selected such the greatest strain differential between the two locations is provided.

It is understood that strain differential is intended to mean the absolute value of the difference between the magnitudes of the strain energy at the highest and lowest strain energy regions on the blade. Since, as have been described above, strain energy is related to the degree to which blade natural vibrational frequency can be affected, the largest possible strain differential within a blade, given the particularly parameters of the fan blades in question, may correspond to the greatest difference natural vibrational frequency separation between the two adjacent blades having an otherwise similar configuration, i.e. when the appropriate frequency modifiers (i.e. airfoil thicknesses) and span-wise locations are located at these selected span-wise locations to correspond with these maximum and minimum regions of strain energy. Alternatively, where multiple options to provide sufficient frequency separation is available within the available strain range, optimizing with other factors of blade design and performance may occur.

One skilled in the art which recognize that locations of expected high and low strain energy may differ with different fan blade geometries and/or operating conditions. The high strain or low strain energy location of each blade will depend upon the vibrational bending mode shape, which in general terms defines the shape of relative deformation of a blade at a particular natural frequency. The precise locations of high or low strain energy will vary depending on blade geometry. In the example of FIGS. 3A-5B, where there is a desire to control for a second bending mode natural frequency within the fan blades, the high strain energy location may be around ⅔rd of total span L1.

Those skilled in the art will be able to determine the regions of high and low strain energy for a given blade geometry by any suitable method, such as by conducting dynamic analyses of the blade design, which may for example entail modal analysis and/or frequency analysis which yields the natural frequencies of a body and the mode shapes of the body for all the natural frequencies. Based on the deformation pattern, strain energy plots are thus obtained by known software tools, and the skilled person will then be able to select the determined suitable locations of high and low strain for the purposes of positioning the frequency modifiers 50, 52 at these locations to provide sufficient frequency separation to address the resonant issue of concern.

As mentioned above, the frequency modifiers 50 and 52 may be disposed on the pressure sides 35 and 37 or suction sides 34 of the first and second fan blades 28, 30, and the thickness variation may be located in the chord-wise direction at any suitable location between their leading edges 36 and trailing edges 38, such as but not limited to the center of gravity of the chord-wise airfoil section. In one particular embodiment, the first frequency modifier 50 extends substantially the entire chord of the first fan blade 28 at the first span-wise distance L2, and the second frequency modifier 52 extends in a chord-wise direction from 10% to 90% of the chord. In this embodiment, the first frequency modifier 50 on the first fan blades 28 has a greater chord-wise extent of the pressure surface 35, than does the second frequency modifier 52 on the pressure surface 35 of the second fan blades 30. Alternately, however, with reference to FIG. 5B, the first frequency modifier 50 may be disposed over a smaller chord-wise distance, for example only corresponding to the identified high strain location 60. The second frequency modifier 52 may also be disposed over a smaller chord-wise direction, for example only corresponding to the identified low strain locations 63, 65. The skilled reader will understand that options are thus available to tune frequency and flutter response while optimizing other factors such as aerodynamics, dynamics, stress and other considerations.

The thickness distributions of the first and second airfoils 31, 33 are accordingly configured to be sufficiently different from each to mistune the alternating first and second fan blades 28 and 30 by creating a frequency separation therebetween under supersonic flow conditions, which thereby reduces the occurrence of, and/or delays the onset of, supersonic flutter of the fan 12. This difference between their respective natural vibration frequencies during operation created between the first and second fan blades 28 and 30 is dependent on the particulars of the blade in question, and in the present example may be between 3% and 10%. In one particular embodiment, the frequency separation between the first and second fan blades 28 and 30 is selected to be greater than or equal to 5%. In one particular embodiment, a frequency separation between the first and second blades 28 and 30 was selected to be 5.1% in order to target, and reduce the occurrence of, second bending mode supersonic stall flutter. Regardless of the exact amount of frequency separation, the first and second fan blades 28 and 30 are therefore said to be intentionally "mistuned" relative to each other, in order to reduce the occurrence and/or delay the onset, of supersonic flutter.

It is of note that the terms "first natural vibration frequency" and "second natural vibration frequency" as used herein are identified as such (i.e. as being a "first" and a "second") simply in order to distinguish between the natural vibration frequencies of the two blade types. These terms are not intended to be construed to relate exclusively to vibrations that are caused, for example, by "first bending modes" or "second bending modes". As previously mentioned, supersonic flutter caused by second bending mode vibration may be addressed through the present teachings. However, fan and other compressor blades may be susceptible to flutter at one or more possible natural frequencies, including first, second and third bending modes, any of which may contribute to supersonic flutter. It is to be understood that the principle of mistuning the fan blades as described herein may be suitably applied to address any of these types of natural frequency vibrations.

The above description is meant to be exemplary only, and one skilled in the art will recognize that changes may be made to the embodiments described without departing from the scope of the described subject matter. Although described above specifically with respect to a fan of a turbofan gas turbine engine, it will be understood that the above-described subject matter relating to mistuning of airfoils to reduce the supersonic flutter susceptibility of the rotor comprising these airfoils can also be applied to other gas turbine engine compressor rotors, including for example the low pressure compressor rotors of such engines, whether turbofan, turboprop or turboshaft engines for example. Further, the compressors described herein may be integrally-bladed rotors (IBRs) or removable-blade rotors, and the vibration frequency modifications described herein can be selected to target any suitable bending mode or torsion mode. Any suitable means of selecting locations for frequency-modifiers may be used, and any suitable means of providing a local thickness reduction or increase may be employed. Although the exemplary embodiments address providing frequency modifiers on the pressure side of the airfoil, to keep the suction side unchanged to simplify aerodynamics design on the suction side, suitable frequency modifiers may be used on the suction surface. It is also be understood that the above-described bladed rotors may be employed in other applications or contexts, such that the principles described herein may be applied to provide any suitable airfoil in any suitable mechanical system operating in any suitable fluid. Other modifications which fall within the scope of the described subject matter will be apparent to those skilled in the art, in light of a review of this disclosure, and such modifications are intended to fall within the appended claims.

The invention claimed is:

1. A mistuned fan for a gas turbine engine, the fan comprising fan blades circumferentially distributed around and extending a total span length from a central hub, the fan blades including successively alternating first and second fan blades each having airfoil with a pressure side and a suction side disposed on opposed sides of a median chord line, the pressure side and suction side extending on opposed sides of the airfoils between a leading edge and a trailing edge, the first and second fan blades respectively having different first and second airfoil thickness distributions, the first airfoil thickness distribution including a first baseline thickness and a first frequency modifier on the pressure side, the first frequency modifier defining an airfoil thickness differential relative to the first baseline thickness and being located at a first span distance away from the central hub, and the second airfoil thickness distribution including a second baseline thickness and a second frequency modifier on the pressure side, the second frequency modifier defining an airfoil thickness differential relative to the second baseline thickness and being located at a second span distance away from the central hub, the second span distance being different from the first span distance, both the first span distance and the second span distance being between 60% and 100% of the total span length of the first and second fan blades, the first and second frequency modifiers generating different natural vibration frequencies for each of the first and second fan blades, wherein a thickness of the airfoil of the first fan blade at the first span distance is less than the thickness of the second fan blade at the first span distance, and a thickness of the airfoil of the second fan blade at the second span distance is less than the thickness of the first fan blade at the second span distance, and the first span distance corresponds to a span-wise location of high strain energy and the second span distance corresponds to a span-wise location of low strain energy.

2. The mistuned fan according to claim 1, wherein the first natural vibration frequency of the first fan blades is less than a baseline frequency and the second natural vibration frequency of the second fan blades is greater than the baseline frequency, wherein the baseline frequency is defined as the natural vibration frequency of a fan blade having corresponding size and shape but absent said first and second frequency modifiers.

3. The mistuned fan according to claim 1, wherein the first and second frequency modifiers comprise at least one of a local region of reduced thickness relative to the first and second baseline thicknesses, respectively, and a local region of increased thickness relative to said first and second baseline thicknesses.

4. The mistuned fan according to claim 3, wherein the first and second frequency modifiers both comprise regions of reduced thickness relative to their respective baseline thicknesses, the thickness of the first and second fan blades at the respective first and second span distances are both less than their respective baseline thicknesses.

5. The mistuned fan according to claim 4, wherein the airfoil thickness of the first fan blades at the first span distance is between 40% and 60% of said baseline thickness of the pressure side.

6. The mistuned fan according to claim 4, wherein the thickness of the second fan blades at the second span distance is between 40% and 60% of said baseline thickness of the pressure side.

7. The mistuned fan according to claim 1, wherein a frequency separation between the first and second natural vibration frequencies is between 3 and 10%.

8. The mistuned fan according to claim 7, wherein the frequency separation between the first and second natural vibration frequencies is greater than or equal to 5%.

9. The mistuned fan according to claim 1, wherein the second span distance is greater than the first span distance.

10. The mistuned fan according to claim 1, wherein the first span distance of the first frequency modifier is disposed between 65% and 100% of the total span length, and the second span distance of the second frequency modifier is disposed between 80% and 100% of the total span length.

11. The mistuned fan according to claim 10, wherein the first span distance of the first frequency modifier is disposed between 65% and 90% of the total span length, and the second span distance of the second frequency modifier is disposed between 90% and 100% of the total span length.

12. The mistuned fan according to claim 1, wherein the first frequency modifier extends over a greater chord-wise extent of the pressure side of the first fan blades than does the second frequency modifier of the second fan blades.

13. The mistuned fan according to claim 12, wherein the first frequency modifier extends in a chord-wise direction substantially the entire cord-wise width of the first fan blades, and the second frequency modifier extends in the chord-wise direction from 10% to 90% of the entire chord-wise width of the second fan blades.

14. A mistuned compressor rotor assembly for a gas turbine engine, the mistuned compressor rotor assembly comprising a hub to which a plurality of airfoil blades are mounted, the airfoil blades having a full span length extending from the hub to tips of the airfoil blades, the airfoil blades each having an airfoil selected from at least first and second airfoil types and arranged as generally alternating with one another around the circumference of the rotor, the first airfoils having an airfoil thickness less than an airfoil thickness of the second airfoils at a first selected span of the respective blades, and the second airfoils having an airfoil thickness less than an airfoil thickness of the first airfoil at a second selected span of the respective blades different from the first selected span, both the first selected span and the second selected span being located within a radially outermost 40% of the full span length of airfoil blades.

15. The mistuned compressor rotor assembly of claim 14, wherein the first and second airfoils have substantially identical thickness distribution profiles but for in regions immediately adjacent the first and second selected spans.

16. The mistuned compressor rotor assembly of claim 14, wherein the first airfoil thickness at the first selected span at least partially provides the first airfoil blade with a lower natural vibration frequency than the second airfoil blade.

17. The mistuned compressor rotor assembly of claim 16, wherein the second airfoil thickness at the second selected span at least partially provides the second airfoil blade with a higher natural vibration frequency than the first airfoil blade.

18. The mistuned compressor rotor assembly of claim 17, wherein the second selected span corresponds in use to a span of a region of strain energy in the second airfoil blade lower than an average strain energy in the second airfoil blade.

19. The mistuned compressor rotor assembly of claim 14, wherein the first selected span corresponds in use to a span of a region of strain energy in the first airfoil blade higher than an average strain energy in the first airfoil blade.

20. The mistuned compressor rotor assembly of claim 19, wherein the second selected span corresponds in use to a span of a region of strain energy in the second airfoil blade lower than an average strain energy in the second airfoil blade.

21. The mistuned compressor rotor assembly of claim 14, wherein the rotor is a fan.

22. The mistuned compressor rotor assembly of claim 14, wherein the airfoil thickness of the first and second airfoils at the first and second selected span locations provide a natural vibration frequency difference between the first and second blade airfoil types of greater than 3%.

23. The mistuned compressor rotor assembly of claim 22, wherein the airfoil thickness of the first and second airfoils at the first and second selected span locations provide a natural vibration frequency difference between the first and second blade airfoil types of between 3% and 10%.

24. The mistuned compressor rotor assembly of claim 14, wherein the first selected span location is associated with a region of high strain energy and the second selected span location is associated with a region of low strain energy.

25. The mistuned compressor rotor assembly of claim 24, wherein the airfoil thickness of the first airfoils is less than the airfoil thickness of the second airfoils at the first selected span location.

26. The mistuned compressor rotor assembly of claim 25, wherein the airfoil thickness of the second airfoils is less than the airfoil thickness of the first airfoils at the second selected span location.

27. The mistuned compressor rotor assembly of claim 14, wherein the first selected span is disposed between 65% and 100% of the full span length, and the second selected span is disposed between 80% and 100% of the full span length.

28. The mistuned compressor rotor assembly of claim 27, wherein the first selected span is disposed between 65% and 90% of the full span length, and the second selected span is disposed between 90% and 100% of the full span length.

29. A compressor for a gas turbine engine, the compressor comprising:
a plurality of first blades having a first airfoil thickness distribution defining a first natural vibration frequency;
a plurality of second blades having a second airfoil thickness distribution different from the first airfoil thickness distribution and defining a second natural vibration frequency different from the first natural vibration frequency;
the first airfoil thickness distribution including a first frequency modifier on the pressure side of the first blades at a first span distance away from the central hub and the second airfoil thickness distribution defining a second first frequency modifier on the pressure side of the second blades at a second span distance away from the central hub, the second span distance different from the first span distance, both the first span distance and the second span distance being between 60% and 100% of a full span length of the respective first and second blades, wherein first and second pressure side airfoil thicknesses are respectively defined by the first and second first frequency modifiers, wherein the first pressure side airfoil thickness of the first blades is less than a thickness of the second blades at the first span distance, and the second pressure side airfoil thickness of the second blades is less than a thickness of the first blades at the second span distance, and the first span distance corresponds to a span-wise location of high strain energy and the second span distance corresponds to a span-wise location of low strain energy.

30. The compressor of claim 29, wherein the first span distance of the first frequency modifier is disposed between 65% and 100% of the full span length, and the second span distance of the second frequency modifier is disposed between 80% and 100% of the full span length.

31. The compressor of claim 30, wherein the first span distance of the first frequency modifier is disposed between 65% and 90% of the full span length, and the second span distance of the second frequency modifier is disposed between 90% and 100% of the total span length.

32. A method of mitigating supersonic flutter in a compressor rotor, the rotor having a plurality of circumferentially disposed blades, the method comprising the steps of:
providing a nominal airfoil having a nominal airfoil definition;
determining a first span location associated with a region of high strain energy expected on the airfoil while in use on the compressor rotor, the first span location being disposed within an outermost 40% of the total span of the blade;
determining a second span location associated with a region of low strain energy expected on the airfoil while in use on the compressor rotor, the second span location being different than the first span location, and both the first span location and the second span location being disposed within the outermost 40% of a total span of the blade;
providing a first blade airfoil definition substantially the same as the nominal airfoil definition but having a different thickness at the first span location associated with the region of high strain energy;
providing a second blade airfoil definition substantially the same as the nominal airfoil definition but having a different thickness at the second span location associated with the region of low strain energy; and
providing the compressor rotor where the blades are providing with the first and second blade airfoil definitions in an alternating fashion around the circumference of the rotor.

33. The method according to claim 32, wherein the region of high strain energy is the highest strain energy expected in the airfoil, and the region of low strain energy is the lowest strain energy expected in the airfoil.

34. The method according to claim 32, wherein the first blade airfoil definition is thinner than the nominal profile at the first span location associated with the region of high strain energy, and the second blade airfoil definition is thinner than the nominal profile at the second span location associated with the region of low strain energy.

35. The method according to claim 32, further comprising selecting relative airfoil thicknesses at the first and second span locations to provide a natural vibration frequency difference between the first and second blade airfoil definitions of greater than 3%.

36. The method according to claim 35, further comprising selecting the relative airfoil thicknesses at the first and second span locations to provide a natural vibration frequency difference between the first and second blade airfoil definitions of between 3% and 10%.

37. The method according to claim 32, wherein, at the first span location associated with the region of high strain energy, the airfoil thickness of the first blade airfoil definition is less than the airfoil thickness of the second blade definition at the same first span location.

38. The method according to claim 37, wherein, at the second span location associated with the region of low strain energy, the airfoil thickness of the second blade airfoil definition is less than the airfoil thickness of the first blade definition at the same second span location.

39. A method of mitigating supersonic flutter for a fan of a turbofan gas turbine engine, the method comprising:
providing the fan with a plurality of fan blades, the fan blades circumferentially distributed around and extending a total span length away from a central hub, the fan blades composed of a plurality of pairs of circumferentially alternating first and second fan blades each having a different airfoil thickness distribution on a pressure side of the fan blades, the airfoil thickness distributions creating different natural vibrational frequencies of each of the first and second fan blades;

selecting a desired frequency separation between natural vibration frequencies of the first and second fan blades in use, the frequency separation selected to mistune the pairs of fan blades to reduce the occurrence of supersonic flutter of the fan blades;

determining respective first and second airfoil thickness distributions of the first and second fan blades to provide said desired frequency separation; and providing the first airfoil thickness distribution on the pressure side of the first fan blade and providing the second airfoil thickness distribution on the pressure side of the second fan blade, wherein the first airfoil thickness distribution includes a first frequency modifier at a first span distance on the first fan blades, and the second airfoil thickness distribution including a second frequency modifier located on the second fan blades at a second span distance different from the first span distance, both the first span distance and the second span distance being between 60% and 100% of the total span length of the first and second span blade, and selecting the first span distance to correspond to a span-wise location of high strain energy and selecting the second span distance to correspond to a span-wise location of low strain energy.

40. The method according to claim 39, further comprising forming a thickness of the airfoil of the first fan blade at the first span distance to be less than the thickness of the second fan blade at the first span distance, and forming a thickness of the airfoil of the second fan blade at the second span distance which is less than the thickness of the first fan blade at the second span distance.

\* \* \* \* \*